United States Patent Office 3,152,044
Patented Oct. 6, 1964

3,152,044
WATER SOLUBLE SALTS OF STEROIDAL-21-ACID SULFATES AND THERAPEUTIC COMPOSITIONS CONTAINING SAME
Eugen Griebsch, Berlin-Britz, and Wilhelm Garn, Berlin, Germany, assignors to Schering AG., Berlin, Germany
No Drawing. Filed Apr. 19, 1960, Ser. No. 23,160
Claims priority, application Germany, Oct. 26, 1957, Sch 23,006; July 12, 1958, Sch 24,383; May 8, 1959, Sch 26,019
23 Claims. (Cl. 167—58)

The present invention relates to new water soluble steroid derivatives, and more particularly to water soluble steroid derivatives having important physiological properties.

This application is a continuation-in-part of our copending application Serial No. 768,028 filed October 20, 1958 for "Water Soluble Steroids" and of our copending application Serial No. 824,217 filed July 1, 1959 for "Water Soluble Steroids," both of said applications now abandoned.

The conversion of steroids, particularly steroid hormones, into water soluble derivatives while retaining the physiological activity of the steroids is an old problem which has been attempted to be solved in a variety of technical manners. However, in general, either the steroids which were produced lacked the desired water solubility, or lacked stability, or even lacked the expected physiological activity.

It is accordingly a primary object of the present invention to provide a series of new water soluble steroid compounds which exhibit the same or substantially the same activity as the original steroids from which they are derived.

It is another object of the present invention to provide water soluble steroid salts which in addition to having a high degree of water solubility also have substantial activity and in some cases at least the equivalent activity as the original steroid from which the salts are derived while even having less side effects than the original steroid.

It is yet another object of the present invention to provide compositions for topical administration which utilize aqueous solutions of the water soluble steroids of the present invention as the active component thereof.

It is a further object of the present invention to provide water soluble derivatives of hydrocortisone, of prednisolone ($\Delta^{1,4}$-pregnadiene-11$\beta$-17$\alpha$-21-triol-3,20-dione) and of specific substitution products of hydrocortisone and of predisolone, which water soluble derivatives have at least the same activity, particularly when used for topical application, as the free steroid alcohols from which the same are formed.

It is another object of the present invention to provide methods of producing the compounds of this invention.

Other objects and advantages of the present invention will be apparent from a further reading of the specification and of the appended claims.

With the above objects in view, the present invention mainly comprises compounds having the following general formula:

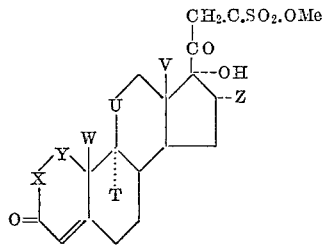

wherein T is selected from the group consisting of hydrogen and halogens, wherein U is selected from the group consisting of —CH$_2$—, —CHOH—, —CO—, and —CHOacyl wherein the acyl is derived from a lower aliphatic carboxylic acid, wherein V is selected from the group consisting of hydrogen and methyl, wherein W is selected from the group consisting of hydrogen and methyl, wherein X—Y is selected from the group consisting of CH$_2$—CH$_2$ and CH=CH, wherein Z is selected from the group consisting of hydrogen and methyl, and wherein Me is selected from the group consisting of hydrogen and the cation of inorganic and organic physiologically compatible bases.

The above compounds may be designated as hemisulfates or acid sulfates. These terms shall be used interchangeably in this application to refer to the SO$_2$.OMe derivative of the steroid alcohols of the present invention.

In connection with the above set forth general formula the substituent T may be hydrogen or a halogen, particularly fluorine.

The above set forth compounds may be produced in accordance with the present invention by converting a steroid alcohol having the following general formula:

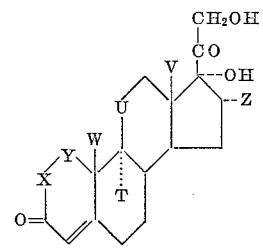

wherein T, U, V, W, X—Y, and Z have the same definitions as above into the acid sulfate, particularly by reaction of the steriod alcohol with the pyridine-sulfur trioxide-adduct, and then converting the same into a physiologically compatible salt, particularly the sodium salt and other salts which will be mentioned below.

Among the physiologically compatible inorganic salts of the present invention are the sodium and potassium salts. Among the physiologically compatible organic salts of the present invention may be mentioned the triethylammonium salts, the tetramethylammonium salts and the choline salts.

In addition to the above mentioned organic salts, it is possible to produce suitable water soluble salts of the steroid-21-acid sulfate and primary amines salts of hydrocortisone-21-hemisulfate and primary amines such as methylamine, ethylamine and aniline, secondary amines such as dimethylamine, diethylamine, ethyl-methylamine, diethanolamine, piperidine, piperazine and methylglucamine, and tertiary amines such as pyridines, $\beta$-oxyethylmorpholine, oxyethylpiperidine and oxymethylpyrrolidine, as well as salts with quaternary ammonium bases such as N-methylpyridinium hydroxide, N-oxyethyl-N-methylpyridinium hydroxide, N-oxyethyl-N-methylpyridinium hydroxide, N-oxyethyl-N-methylpyrrolidinium hydroxide, N-($\beta$-oxyethyl)-N-methylmorpholinium hydroxide and N,N-dimethylmorpholinium hydroxide.

The advantages of the various compounds of the present invention becomes apparent from a consideration of specific advantages of certain specific compounds of the invention. Thus, in the case of the sodium salt of hydrocortisone-21-hemisulfate the water solubility is approximately 27 grams in 100 cc. of water, which is extraordinarily high. Its aqueous solutions exhibit a remarkable stability. They remain stable at room temperature for more than a year, at an increased temperature of 100° C. for more than 50 hours without decomposition, and the aqueous solutions can be sterilized at 120° C. In an accelerated stability or shelf-life test the sodium salt solution exhibits no decomposition upon storage for 2 months at 50° C. The water-free salt can be stored at room temperature indefinitely.

The hydrocortisone-21-hemisulfate of the present invention and the salts thereof, particularly the sodium salt, can be used in aqueous solution in nose-drops, since it exhibits in full strength the known action of hydrocortisone against colds, based on its action on shrinking nasal membranes.

As compared to the hitherto used hydrocortisone nose-drops in which the active ingredient is contained in a propylene glycol solution, the aqueous solutions of the water soluble hemisulfates of the present invention have the great advantage of causing no burning sensation in the nose.

The 21-hemisulfate of hydrocortisone may, as indicated above, be produced by methods described in the literature for the production of sulfuric acid esters of other hydroxide group-containing steroids preferably by the use of pyridine-sulfur-trioxide-adducts.

The advantages of the present invention may be further illustrated by the following discussion of the sodium salt of prednisolone-21-hemisulfate.

The advantages of the compounds of the present invention may be illustrated by the following discussion of the sodium salt of prednisolone-21-hemisulfate. The water solubility of the sodium salt amounts to 40% at 22° C. The aqueous solutions thereof exhibit a remarkable stability, such aqueous solutions remaining stable at room temperature for longer than one year. At an increase temperature of 100° C. maintained for more than twenty-four hours, the solution remains weight constant without decomposition ($\alpha_D$ before heating $= +101.8°$, $\alpha_D$ after heating $= +98.7°$) and the solutions can be sterilized at 110° C. In an accelerated stability or shelf-life test the sodium salt exhibits no decomposition upon storage for six months at 50° C. The water-free salt can be stored at room temperature indefinitely.

A further indication as to the advantages of the compounds of the present invention may be had from the following:

The effectiveness of hydrocortisone with respect to the effectiveness of prednisolone upon peroral application of these free alcohols is approximately between 1:3 to 1:5. However, upon topical or local application of the 21-hemisulfate-sodium salts in lotio the relationship is only 1:2. In view of the foregoing it might be assumed from the fact that dexamethasone (9α-fluor-16α-methyl-prednisolone) in comparison to prednisolone shows upon peroral administration of the free alcohols an effectiveness which is about 7 times greater than the effectiveness of the prednisolone, so that it would be expected that local application of the hemisulfate sodium salts of these compounds in lotio, a similar relationship, at best, of the effectiveness would be obtained.

However, it was found that in fact upon local application of the sodium salt of dexamethasone-21-hemisulfate in lotio a reliable clinical effect is achieved with a concentration which is $\frac{1}{25}$ of the concentration needed for prednisolone-21-hemisulfate sodium salt.

The basic advantage of the present invention is that by transforming the starting steroid alcohols into water soluble derivatives which are stable in aqueous solution the pharmaceutical effect of the resulting derivative is considerably increased at the point of local application. At the same time, in addition, the danger of undesirable side effects of the general metabolism is reduced to a minimum because the hemisulfate salts upon peroral or parenteral administration have practically no activity.

It is clear from the above that the compounds of the present invention are particularly suitable in compositions for topical administration and accordingly the preferred embodiment of the present invention mainly comprises a vehicle for topical administration including water in which the water soluble compounds of the present invention are dissolved.

It has been discovered that when the water soluble compounds of the present invention are applied topically by means of a suitable vehicle the compounds have the full activity as the basic alcohol from which the same are derived, with the advantages of water solubility, plus additional advantages of reduced side effects.

Thus, in accordance with the present invention, the compounds of the invention may be distributed in salves, eye drop solutions, nose drop solutions, suppositories, vaginal tablets, lotions, etc. These compositions may be used for treatment of allergic and/or inflammation diseases of the skin, of the nose, of the eyes, of the anus, of the vagina, cavity of the mouth, etc. The compositions of the present invention define particularly advantageous application in the form of water soluble salves which can be used on the skin, particularly on hairy portions of the body and on patients whose skin is sensitive to fats.

The compounds of the present invention may be used with aqueous vehicles for topical administration or with water soluble vehicles for topical administration. Thus, in the case of salves, it is possible to distribute the compounds of the present invention in water-in-oil emulsions, oil-in-water emulsions, and salves whose base is polyethylene oxide.

In the case of nose drop compositions and eye drop compositions water may be used as the vehicle for topical administration, if necessary with the addition of a bacteria-static agent. Polyethylene oxide may be used as a suppository base, and milk sugar, corn starch, magnesium stearate or the like may be used as the carrier for forming vaginal tablets according to the present invention. The lotions of the present invention may be made with water as the vehicle, with the addition of a thickening agent such as carboxymethyl cellulose.

In addition to the advantage of full activity when administered topically and water solubility, the compounds of the present invention also have the advantage of having no undesirable side effects. This important advantage permits topical administration of a massive dose of the hemisulfate of the present invention where a local limited strong action is needed without any side effects. It is possible to use a considerably higher concentration of the prednisolone-21-hemisulfate salts of the present invention in topical administration than in the case of known prednisolone preparations, without any undesirable side effects occurring.

The following examples are given to further illustrate the present invention. The scope of the invention is not, however, meant to be limited to the specific details of the examples.

EXAMPLE 1

*Production of the Sodium Salt of Hydrocortisone-21-Sulfate*

The pyridine-SO₃-adduct is first produced by the dropwise introduction of 4.68 g. of liquid SO₃ under cooling to —5° C. into 160 cc. of dry pyridine in a nitrogen atmosphere. The resulting reaction mixture is then added in the cold to a solution of 20.9 g. of hydrocortisone in 140 cc. of dry pyridine. The mixture is stirred at 0° C. for 1½ hours whereby the pyridine-SO₃-adduct goes practically completely into solution. The temperature is increased to 20° C. and the reaction solution is allowed to stand for an additional 2½ hours at room temperature. A practically clear, light yellow colored solution already starts to form in the first 20 minutes. The pyridine is then distilled off under vacuum at a temperature of approximately 40–45° C. The oil remaining in the flask is stirred into a paste with about 50 cc. of dry ether and the ether removed by decantation after a sufficient time to permit the oil to become solidified. The resulting crystalline paste is then covered with about 250 cc. of ether and permitted to stand overnight. The ether is removed by suction filtration and the substance remaining is dissolved in approximately 300 cc. of methanol and the solution is titrated under stirring with an approximately 1-n-sodium methylate solution to a pH of 9 (utilizing a glass electrode). The voluminous sodium sulfate precipitate remaining from the titration is removed by suction filtration, the residue washed with a small amount of methanol and the wash solution purified with the filtrate.

The filtrate is concentrated at a bath temperature of 35–40° C. to a volume of 100 cc., the concentrated solution is cooled to about −45° C. and is then slowly added dropwise by means of a dropping funnel into approximately 600 cc. of ether. The resulting crystal suspension is subsequently cooled for 1 hour and subjected to suction filtration.

18.60 g. of fraction 1 is obtained, which corresponds to 86.8% of the theoretical. The melting point is 185° C. with decomposition. The compound forms a clear solution with water, the pH being 7.0. $[\alpha]_D = +130.5°$ in water.

By repeating the above described pre-purification an additional 2.72 g. of the sodium salt of hydrocortisone sulfate having a specific rotation of 128–131.5° and a melting point of 175–177° with decomposition is obtained from the filtrate.

The unconverted hydrocortisone can be isolated from the remaining mother liquor.

EXAMPLE 2

*Production of Sodium Salt of Hydrocortisone Sulfate*

5 g. of amido-sulfonic acid in 50 cc. of water-free pyridine is heated under stirring and in a nitrogen stream to 100° C. and 5 g. of hydrocortisone is added at one time into the reaction mixture. The heating of the reaction mixture to 100° C. is continued for exactly 3 minutes, the flask subsequently cooled under nitrogen and the contents of the flask after reacting an internal temperature of 35–40° C. subjected to vacuum distillation until the pyridine is completely driven off.

A viscous oil remains which is stirred three times with ether whereupon the ether is removed by decantation. The oil solidifies to a solid substance which is then dissolved in 150 cc. of water-free methanol, filtered from the undissolved matter and reacted with an approximately 1-normal-methanol sodium hydroxide solution to a pH of 11.3. A total of 18.5 cc. is needed. The yellowish appearing turbid methanolic solution is shaken with about 2 g. of activated charcoal for one hour under nitrogen and subsequently filtered.

The filtrate is allowed to stand overnight in a cooling cabinet at −20° C. and again filtered if necessary.

The filtrate is concentrated under vacuum to about 50 cc. volume and again freed from the formed turbidity by filtration. The concentration is then continued until the solution has a volume of about 20 cc. 30 cc. of acetone is added thereto whereby a substance separates in the form of a precipitate which sticks to the walls of the vessel. The remaining solution is removed by decantation and the residue dried under vacuum at 60° C. There is thus obtained 2.84 g. of a light yellow colored substance which decomposes at 184° C., and which forms clear solutions in water. $[\alpha]_D = +123°$ in water.

The decanted solution is reacted with 50 cc. of ether resulting in the precipitation of a white substance which is further treated exactly as fraction 1 above.

After drying 2.22 g. having a melting point with decomposition at 181° C. is obtained. $[\alpha]_D = +125.8°$ in water. The substance forms clear solutions with water.

The decanted solution is concentrated to dryness and 0.47 g. of a water insoluble product is obtained. This product is discarded. Fraction 1 and fraction 2 exhibit in ultraviolet and infrared spectrums the characteristic bands for 3-keto-Δ-4 compounds, as well as for the 11β- and 17β-OH groups.

ANALYSIS

Fraction 1: Percent
C _____ 53.9
H _____ 6.6
O _____ 27.1
S _____ 6.6
Na _____ 4.6

Fraction 2: Percent
C _____ 53.5
H _____ 6.9
O _____ 26.9
S _____ 6.6
Na _____ 4.8

Calculated: Percent
C _____ 54.25
H _____ 6.3
O _____ 27.6
S _____ 6.9
Na _____ 4.95

EXAMPLE 3

*Production of Sodium Hydrocortisone Sulfate From Hydrocortisone and Chlorosulfonic Acid*

A solution of 0.086 cc. of chlorosulfonic acid in 6 cc. of dry pyridine is added at room temperature to a solution of 0.400 g. of hydrocortisone in 10 cc. of dry pyridine under stirring. The pyridine-chlorosulfonic acid solution is prepared by careful dropwise addition of the chlorosulfonc acid at 0° C. into dry pyridine. The substance which is precipitated on the walls of the flask by spraying is again brought into solution by stirring.

The hydrocortisone-chlorosulonic acid solution takes on a weak orange color upon standing. After 22 hours of standing at room temperature 0.1 cc. of water is added to the solution and the pyridine is subsequently distilled off under vacuum at a bath temperature of 30° C. The residue is dried at room temperature under vacuum over sulfuric acid (0.93 g. light yellow oil), subsequently dissolved in 15 cc. of methanol and titrated under nitrogen with 1 normal methanolic sodium hydroxide solution to a pH of 10.4. The precipitate formed by titration (inorganic substance) is suctioned off with a porcelain filter and the filtrate is concentrated under vacuum at a bath temperature of 30° C. to a volume of 4 cc. The separated substance is subjected to suction filtration under nitrogen, washed with 2 c. of methanol and discarded.

The filtrate is reacted with 100 cc. of ether resulting in the precipitation of a substance which after standing for 3 hours is subjected to suction filtration, washed with ether and dried over phosphorous pentoxide. There is thus obtained a 0.514 g. of a crude product decomposing at 165° C.

$[\alpha]_D = +177.3°$ in water.

By dissolving the substance in n-propanol and filtering the strongly turbid solution, and subsequently precipitating with ether it is possible to purify the sodium hydrocortsone sulfate. There is thus obtained 0.455 g. (yield=89.2% of the theoretical) of the substance having a decomposition point of 178° C. and a specific rotation $[\alpha]_D$ of $+128°$.

EXAMPLE 4

*Production of Potassium Hydrocortisone Sulfate*

The residue upon evaporation from the reaction of 0.240 g. of hydrocortisone in pyridine with pyridine-SO₃-complex is dissolved in 15 cc. of methanol and titrated under nitrogen with 1 normal methyl alcohol potassium hydroxide solution to a pH of 11. The turbidity resulting from the titration is removed by filtration and the practically colorless filtrate is concentrated under nitrogen in vacuum at a bath temperature of 30° C. to a volume of about 4 cc.

15 cc. of ether is slowly added to the solution under stirring and after standing for one hour the precipitated substance is separated by suction filtration. After washing with ether the substance is dried at room temperature over phosphorous pentoxide.

The yield is 0.262 g. The decomposition temperature is 178° C.

The potassium salt can be purified by reprecipitation from methanol-ether, the resulting compound then having a specific rotation of +131.8° in water and a decomposition temperature of 179° C.

EXAMPLE 5

*Production of Triethylammonium Hydrocortisone-Sulfate*

The residue upon evaporation from the reaction of 0.186 g. of hydrocortisone in pyridine with pyridine-$SO_3$-complex is dissolved in 1 cc. of methanol and 1 cc of freshly distilled triethylamine is added thereto. Additional triethylamine is then added to the solution until turbidity starts to form. After standing overnight the precipitated crystals are separated by suction filtration and washed first with some triethylamine and then with ether. The crystals are dried at room temperature in a desiccator over phosphorous pentoxide. The yield amounts to 0.1213 g. The melting point is 188–189° C. and the decomposition point is 193° C.

The salt can be purified by being dissolved in methanol and reacting the solution with triethylamine until turbidity starts to form. The product purified in this manner has a melting point of 191–193° C., decomposes at 19° C. and has a specific rotation $[\alpha]_D$ of 117.8° in water.

EXAMPLE 6

*Production of Tetramethylammonium Hydrocortisone Sulfate*

The residue upon evaporation of the reacting product of 0.24 g. of hydrocortisone in pyridine with pyridine-$SO_3$-complex is dissolved in 4 cc. of methanol and reacted under nitrogen with methanolic tetranethylammonium solution to a pH of 11.

22 cc. of ether is slowly added to the clear solution under stirring and the formed crystals after standing for one hour are filtered off by suction, and then dried in a desiccator over phosphorous pentoxide.

The yield amounts to 0.285 g. The decomposition point is 232–235° C.

The obtained tetramethylammonium salt of hydrocortisone sulfate is purified by being dissolved in 5 cc. of water, filtering the solution and adding 25 cc. of ether to the filtrate. The formed crystals exhibit a decomposition point of 230° C. and a specific rotation $[\alpha]_D$ of +126.3° in water.

EXAMPLE 7

*Production of the Choline Salt of Hydrocortisone Sulfate*

The residue upon evaporation of the reaction product of 0.241 g. of hydrocortisone in pyridine with pyridine-$SO_3$-complex is dissolved in 15 cc. of methanol and reacted under vacuum with a methanolic choline solution to a pH of 10.9.

The remaining clear solution is concentrated in vacuum under nitrogen at a temperature of 30° C. to a volume of 4 cc. and 40 cc. of ether is then added to the solution under stirring.

After standing for 3 hours the crystals are separated by suction filtration, washed with ether and dried at room temperature in a desiccator over phosphorous pentoxide.

The yield amounts to 0.345 g. The decomposition point is 231–232° C. (brown coloration at 210° C.).

For the purpose of purification the choline salt is dissolved in 1 cc. of methanol, the solution filtered and 5 cc. of gasoline (boiling point 60–80° C.) slowly added to the solution. The precipitated crystals (needles) are filtered off under suction and washed with gasoline. The decomposition point is 225–227° C. $[\alpha]_D = 119.30°$ in water.

EXAMPLE 8

*Production of the Sodium Salt of Prednisolone-21-Hemisulfate*

200 cc. of dry pyridine are cooled in a 2 liter round necked flask to −10° C. while stirring and excluding moisture. 6.4 g. of sulfur trioxide are then distilled into the pyridine. 27 g. of prednisolone dissolved in 100 cc. of dry pyridine are then added to the thus produced pyridine-$SO_3$-adduct at −10° C. and it is washed into the solution with an additional 80 cc. of pyridine.

The reaction mixture is stirred for an additional 15 minutes whereupon the solution becomes clear. After 48 hours of reaction at room temperature the pyridine is distilled off at a 30° C. bath temperature under vacuum and under nitrogen. The oily residue is then dried in a vacuum chamber over phosphoric acid, the pyridine-free substance is dissolved in 500 cc. of methanol and the solution is mixed in a nitrogen atmosphere under stirring with approximately one normal sodium methylate solution until a pH of 11.8 is obtained.

The substance which precipitates by this titration (inorganic salt) is filtered off under suction over a G-4 porcelain frit under nitrogen and washed with 60 cc. of methanol. The yellow colored methanol solution is mixed at a bath temperature of 30° C. with 1.8 liters of ether. Aften standing overnight at −5° C. the precipitated substance is filtered off by suction, washed with 400° C. of ether and dried.

There is thus obtained 35 g. of sodium prednisolone-21-hemisulfate having a melting or decomposition point of 172–175° C.; $[\alpha]_D^{20} = +100°$ (in water).

The thus obtained crude substance is for purification purposes dissolved in 200 cc. of methanol, the not completely clear solution is shaken with some decolorizing carbon and, under nitrogen, suction filtered on a G-4 frit. The salt is again precipitated from the methanol solution with 1.7 liters of ether, the separation of the precipitate being completed after standing for two hours. There is thus obtained after drying in vacuum over phosphorous pentoxide 31.25 g. of sodium prednisolone-21-hemisulfate having a melting point of 179° C. (with decomposition).

$[\alpha]_D^{20} = 101.8°$ (in water). The pH of a 0.5% solution equals 7.35.

Absorption maximum in ultraviolet: $\epsilon_{242} = 14,740$.

EXAMPLE 9

*Production of Eye Drops*

The following are dissolved in 100 cc. of distilled water:

| | Mg. |
|---|---|
| Sodium prednisolone hemisulfate | 320 |
| Chloramphenicol | 200 |
| Water-free sodium sulfite | 400 |
| Citric acid | 37 |
| Secondary sodium phosphate | 233.6 |
| Nipagin-sodium (the sodium salt of p-oxygenzoic acid-methyl ester) | 70 |
| Nipasol-sodium (the sodium salt of p-oxygenzoic acid-propyl ester) | 30 |

9

The final solution, which has a pH of 7.3, is packed in 3 cc. dropper bottles.

EXAMPLE 10

Production of Lotion

The following are dissolved in 100 cc. of distilled water:

|  | Mg. |
|---|---|
| Sodium prednisolone hemisulfate | 320 |
| Chloramphenicol | 200 |
| Sorbic acid | 100 |
| Sodium carboxymethyl cellulose | 700 |
| Tween 20 | 100 |

The finished solution which has a pH of 4.7 is packed in 100 cc. containers.

EXAMPLE 11

Production of the Triethylammonium Salt of 9α-Fluor-16α-Methyl-Prednisolone-21-Hemisulfate 220 mg. of liquid sulfuric acid anhydride ($SO_3$) are vaporized in a nitrogen stream in 10 cc. of dry pyridine which is at a temperature of −5 to −10° C.

1.04 g. of 9α-fluor-16α-methyl-prednisolone, dissolved in 5 cc. of pyridine and cooled to −5° C., are allowed to flow into the resulting suspension and then washed down with 5 cc. of cold pyridine. About 10 minutes after the addition of the substance a clear solution results. The reaction mixture is stored for 68 hours at 0 to −2° C. The pyridine is subsequently distilled off under vacuum at about temperature of 30° C. and under nitrogen and after drying in a desiccator over concentrated sulfuric acid and phosphorous pentoxide a foamy residue of 1.76 g. is obtained.

The residue is dissolved in 6 cc. of normal propanol and 4 cc. of triethylamine are added thereto until the start of a slight turbidity. This is the start of the crystallization. The crystalline suspension is allowed to stand for an additional 2 hours, cooled at the end to 0° C. and the crystals are separated by a suction filter. The crystals are washed with 5 cc. of a mixture of n-propanol/triethylamine 1:1, and then dried.

The yield of the triethylammonium salt is 1.183 g. The melting point is 199/200–201° C. (slight gassing). The molecular weight is 573.71.

The empirical formula is $C_{28}H_{44}O_8SNF$.

The salt is clear and easily soluble in water and methanol.

UV-Absorption: $\epsilon_{238}$:14,920.

EXAMPLE 12

Production of the Sodium Salt of 9α-Fluor-16α-Methyl-Prednisolone - 21 - Hemisulfate From the Triethylammonium Salt 500 mg. of the triethylammonium salt of 9α-fluor-16α-methyl-prednisolone-21-hemisulfate are dissolved in 10 cc. of methanol and titrated with 0.5 n-alcoholic sodium hydroxide to the equivalent point (pH: 10.4). This somewhat turbid solution is filtered, concentrated in a nitrogen stream to approximately 8 cc. and covered with a layer of 100 cc. of ether. After precipitation of the white precipitate the same is filtered off under suction, washed with ether and dried in a vacuum desiccator over phosphorous pentoxide.

The yield is 422.9 mg. The melting point is 182/182.5° C. (with decomposition). The sodium salt forms clear solutions in water. The pH of the aqueous solution is 7.0.

$[\alpha]_D$: −64° in water.

EXAMPLE 14

Salts of Prednisolone-21-Hemisulfate

(a) PYRIDINIUM SALT 680 mg. of liquid sulfuric acid anhydride ($SO_3$) (101.5% calculated with respect to the amount of prednisolone used) are distilled into 10 cc. of pyridine cooled to −5 to −10° C. in a nitrogen stream and to the resulting suspension 3.00 g. of prednisolone (not without residue dissolved in 15 cc. of pyridine) are added thereto and then washed in with 10 cc. of pyridine.

During the time period of 1 hour the temperature is increased to approximately 20° C. and a practically clear solution results thereby. The reaction mixture is allowed to stand for an additional 41 hours at room temperature. The solution becomes slightly yellowish in color. The pyridine is subsequently distilled off under vacuum under nitrogen at a bath temperature of 30° C. and after drying in a desiccator over concentrated sulfuric acid a foamy residue of 4.98 g. (slightly yellowish color) is obtained. The foamy mass is covered with 20 cc. of n-propanol whereupon the substance starts to crystallize. The resulting crystals are filtered off after 4 hours by suction filtration and washed with 8 cc. of n-propanol, and subsequently dried.

The yield is 3.82 g. of the pyridine salt of prednisolone acid sulfate. The melting point 160° C, becoming turbid at 173° C. and gassing at 186° C. The product is easily soluble in water and methanol forming clear solutions.

UV-Absorption: $\epsilon_{240}$:15,730. (The extinction value is increased by approximately 2000 by the pyridine in the molecule.)

Infra-red spectrum prove all of the known characteristics of the arrangement of the compound.

(b) TRIETHYLAMMONIUM SALT 3.72 g. of the pyridinium salt of prednisolone-21-hemisulfate are dissolved in 12 cc. of methanol, filtered and washed with some methanol. Triethylamine is allowed to run in under stirring. Crystallization occurs under slight warming. After standing overnight the remaining crystals of triethylammonium salt are filtered off, washed with a mixture of methanol-triethylamine 1:1 and dried in vacuum over concentrated sulfuric acid and phosphorous pentoxide.

The yield is 3.33 g. The melting point is 201–202° C. (gassing). The product is easily soluble in water and methanol and forms clear solution.

(c) THE SODIUM SALT FROM THE TRIETHYLAMMONIUM SALT 1000.6 mg. of the triethylammonium salt of prednisolone-21-hemisulfate are dissolved in 10 cc. of methanol and with approximately 0.5 normal methanolic sodium hydroxide titrated to the equivalent point (pH:10.3). The methanolic solution is concentrated under vacuum at about the temperature of the bath of 30° C. in the nitrogen stream to a volume of approximately 8 cc., 20 cc. of n-propanol are added thereto and the methanol is distilled off under vacuum until the total amount of the solution is about 10 cc. The propanol solution is subsequently covered with 50 cc. of ether, the light yellow-appearing precipitate is filtered off under suction and washed with 50 cc. of a n-propanol: ether-mixture in a ratio of 1:4. After drying the yield is 789.1 mg. The melting point is 158–161° C. (with decomposition).

$[\alpha]_D$:+138° in water (c.=0.5). The pH of a 0.5% solution is 7.2.

EXAMPLE 15

The Triethylammonium Salt of 9α-Fluor-Hydrocortisone-21-Hemisulfate.

A solution of 2.62 g. of 9α-fluor-hydrocortisone and 20 cc. of pyridine is introduced into a suspension of sulfuric acid-pyridine-adduct in 20 cc. of pyridine (produced by introducing 520 mg. of sulfuric acid anhydride into the pyridine at —5° C. under stirring) and the solution is then washed in with 5 cc. of cold pyridine. The solution becomes completely clear after about 10 minutes after forming the reaction mixture. The reaction mixture is permitted to stand for an additional 72 hours at —4 to 0° C. and the pyridine is subsequently distilled off at a bath temperature of 30° C. under nitrogen and under vacuum.

The residue which is obtained by drying in a desiccator over concentrated sulfuric acid (the pyridinium salt of 9α-fluor-hydrocortisone-21 - hemisulfate) is foamy and somewhat yellowish in color. The yield is 4.13 g.

The residue is dissolved in 6 cc. of methanol and under stirring 9.1 cc. of triethylamine is introduced slowly until the start of turbidity appears. After several minutes the crystallization starts to begin. The solution is allowed to stand overnight at 0° C. and the triethylammonium salt of 9α-fluor - hydrocortisone - 21-hemisulfate is filtered off under suction and dried. The yield is 3.01 g. The melting point is 202–203° C. (with decomposition).

$[\alpha]_D$: 104.3° in water (c.=0.5%)
UV: $\epsilon_{239}$:=16,750.

Clearly defined bands appear in infra-red spectrum.

The salt which is obtained by recrystallization from n-propanol-alcohol mixture gives an ε-value which is practically identical with that which is obtained from the directly produced salt. The melting point is 195–196° C. (with decomposition). $\epsilon_{239}$:18,820.

EXAMPLE 16

*The Sodium Salt of 9α-Fluor-Hydrocortisone-21-Hemisulfate.*

The pyridinium salt of 9α-fluor-hydrocortisone-sulfate produced acording to Example 15 is dissolved in methanol and titrated with 1 normal methanolic sodium hydroxide solution to the equivalent point. The slightly turbid solution is filtered and the solution is concentrated under vacuum and under nitrogen at a bath temperature of 30° C. After the addition of ether a white precipitate forms which is filtered off under suction, washed with ether and dried. The resulting sodium salt is soluble in water forming clear solution. The melting point is 190° C. (with decomposition).

$[\alpha]_D$: +118.2° in water (c.=0.5%).
The pH of 0.5% solution is 7.4.
UV: $\epsilon_{239}$:15,820, at a 5% water content of the substance tested.

The infra-red spectrum confirms the structure of the named compound. The stability of the aqueous solution of the sodium salt is very good. The following table indicates the stability of an unbuffered 0.5% solution of the sodium salt of 9α-fluor-hydrocortisone-21-hemisulfate sterilized for 1 hour at 100° C.

What is claimed as new and desired to be secured by Letters Patent is:

1. A compound of the formula:

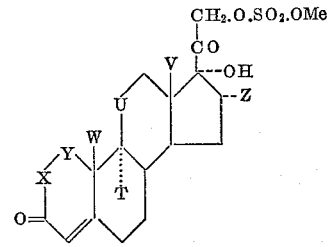

wherein T is selected from the group consisting of hydrogen and fluorine; wherein U is —CHOH—; wherein V is methyl; wherein W is methyl; wherein X—Y is selected from the group consisting of $CH_2$—$CH_2$ and CH=CH; wherein Z is selected from the group consisting of hydrogen and methyl; and wherein Me is selected from the group consisting of hydrogen and the cation of inorganic and organic physiologically compatible bases.

2. The sodium salt of hydrocortisone-21-acid sulfate.
3. The potassium salt of hydrocortisone-21-acid sulfate.
4. The triethylammonium salt of hydrocortisone-21-acid sulfate.
5. The tetramethylammonium salt of hydrocortisone-21-acid sulfate.
6. The choline salt of hydrocortisone-21-acid sulfate.
7. The sodium salt of prednisolone-21-acid sulfate.
8. The triethylammonium salt of 9α-fluor-16α-methyl-prednisolone-21-acid sulfate.
9. The sodium salt of 9α-fluor-16α-methyl-prednisolone-21-acid sulfate.
10. The pyridinium salt of prednisolone-21-acid-sulfate.
11. The triethylammonium salt of prednisolone-21-acid sulfate.
12. The triethylammonium salt of 9α-fluoro-hydrocortisone-21-acid sulfate.
13. The sodium salt of 9α-fluoro-hydrocortisone-21-acid sulfate.
14. A method of producing water soluble steroids which comprises reacting a steroid of the formula:

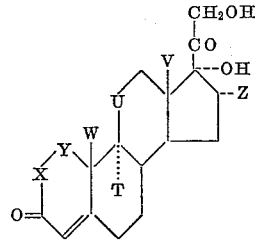

wherein T is selected from the group consisting of hydrogen and fluorine, wherein U is —CHOH—, wherein V

|  | 50° | | | Room temperature | | |
|---|---|---|---|---|---|---|
|  | pH | $(\alpha)_D$ | Appearance | pH | $(\alpha)_D$ | Appearance |
| Start | 7.4 | +118° | Colorless, clear | 7.4 | +118° | Colorless, clear. |
| After 5 months | 5.0 | +114° | Weak yellowish color; clear. | 6.6 | +116° | Do. |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

is methyl, wherein W is methyl, wherein X—Y is selected from the group consisting of $CH_2$—$CH_2$ and CH=CH, and wherein Z is selected from the group consisting of hydrogen and methyl, with pyridine-sulfur trioxide-adduct so as to form the corresponding steroid-21-acid sulfate; and reacting said steroid-21-acid sulfate with a base the cation of which is physiologically compatible so as to form the corresponding physiologically compatible salt of said steroid-21-acid sulfate.

15. A method of producing water soluble steroids which comprises reacting a steroid of the formula:

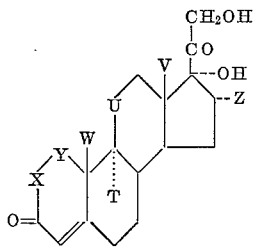

wherein T is selected from the group consisting of hydrogen and fluorine, wherein U is —CHOH—, wherein V is methyl, wherein W is methyl, wherein X—Y is selected from the group consisting of CH₂—CH₂ and CH═CH, and wherein Z is selected from the group consisting of hydrogen and methyl, with pyridine-sulfur trioxide-adduct so as to form the corresponding steroid-21-acid sulfate; and reacting said steroid-21-acid sulfate with a base the cation of which is physiologically compatible and is selected from the group consisting of sodium, potassium, triethylammonium, tetramethylammonium, choline and pyridinium so as to form the corresponding physiologically compatible salt of said steroid-21-acid sulfate.

16. A composition for topical administration comprising an aqueous vehicle for topical administration in which is dissolved a therapeutically effective amount of a compound of the formula:

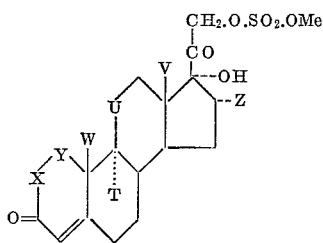

wherein T is selected from the group consisting of hydrogen and fluorine, wherein U is —CHOH—, wherein V is methyl, wherein W is methyl, wherein X—Y is selected from the group consisting of CH₂—CH₂ and CH═CH, wherein Z is selected from the group consisting of hydrogen and methyl, and wherein Me is selected from the group consisting of hydrogen and the cation of inorganic and organic physiologically compatible bases.

17. The method of locally treating inflammatory and allerging conditions which require topical application of a steroid, which comprises topically applying to the body area of a patient having such condition requiring such treatment a compound of the formula:

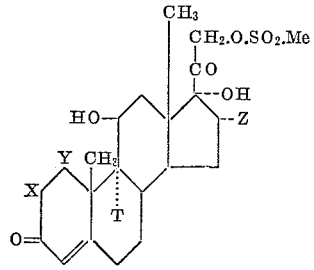

wherein X—Y is selected from the group consisting of CH₂—CH₂ and CH═CH, wherein Z is selected from the group consisting of hydrogen and methyl, wherein T is selected from the group consisting of hydrogen and fluorine and wherein Me is selected from the group consisting of hydrogen and the cation of inorganic and organic physiologically compatible bases.

18. The method of locally treating inflammatory and allerging conditions which require topical application of a steroid, which comprises topically applying to the body area of a patient having such condition requiring such treatment an aqueous solution of a compound of the formula:

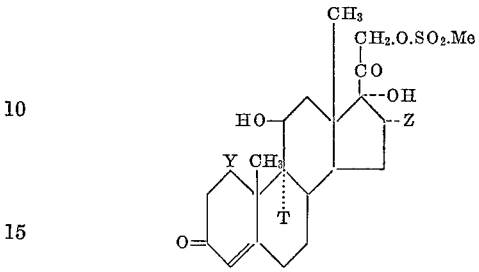

wherein X—Y is selected from the group consisting of CH₂—CH₂ and CH═CH, wherein Z is selected from the group consisting of hydrogen and methyl, wherein T is selected from the group consisting of hydrogen and fluorine and wherein Me is selected from the group consisting of hydrogen and the cation of inorganic and organic physiologically compatible bases.

19. The method of shrinking a patient's membrane, which comprises applying to the membrane to be shrunk a compound of the formula:

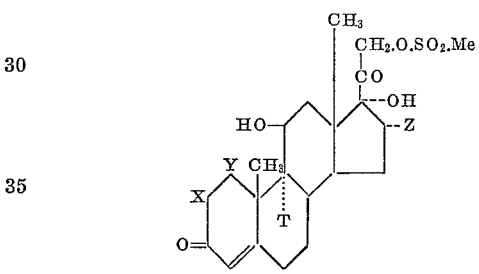

wherein X—Y is selected from the group consisting of CH₂—CH₂ and CH═CH, wherein Z is selected from the group consisting of hydrogen and methyl, wherein T is selected from the group consisting of hydrogen and fluorine and wherein Me is selected from the group consisting of hydrogen and the cation of inorganic and organic physiologically compatible bases.

20. The method of locally treating inflammatory and allerging conditions which require topical application of a steroid, which comprises topically applying to a patient's body area requiring such treatment the sodium salt of hydrocortisone-21-acid sulfate.

21. The method of locally treating inflammatory and allerging conditions which require topical application of a steroid, which comprises topically applying to a patient's body area requiring such treatment the sodium salt of prednisolone-21-acid sulfate.

22. A composition for topical administration comprising an aqueous vehicle for topical administration in which is dissolved a therapeutically effective amount of the sodium salt of hydrocortisone-21-acid sulfate.

23. A composition for topical administration comprising an aqueous vehicle for topical administration in which is dissolved a therapeutically effective amount of the sodium salt of prednisolone-21-acid sulfate.

References Cited in the file of this patent
UNITED STATES PATENTS

| | | |
|---|---|---|
| 2,814,631 | Gould | Nov. 26, 1957 |
| 2,828,306 | Griebsch et al. | Mar. 25, 1958 |
| 2,837,464 | Nobile | June 3, 1958 |
| 2,871,160 | Johnson et al. | Jan. 27, 1959 |

OTHER REFERENCES

Cavina: Rendiconti Instituto Superiore Di Sanita, vol. 20, July 14, 1956, pages 925–930, 931–941 and 992.